United States Patent [19]
DiCecco et al.

[11] 3,977,745
[45] Aug. 31, 1976

[54] APPARATUS FOR RESTORING CATHODE-RAY TUBES

[75] Inventors: Enio DiCecco; Mario Costante Totti, both of Milan, Italy

[73] Assignee: Safe Electronic Systems S.A., Mauren, Liechtenstein

[22] Filed: May 15, 1975

[21] Appl. No.: 577,742

Related U.S. Application Data

[63] Continuation-in-part of Ser. No. 395,344, Sept. 7, 1973, abandoned.

[30] Foreign Application Priority Data

Sept. 25, 1972 Italy .................................. 29657/72

[52] U.S. Cl. ........................................ 316/28; 316/2
[51] Int. Cl.² ............................................ H01J 9/50
[58] Field of Search ..................... 316/2, 28; 324/23; 315/106

[56] References Cited
UNITED STATES PATENTS 2,717,190  9/1955  Shoup ........................ 316/2
2,774,645  12/1956  Batchelor, Jr. ................. 316/2
2,897,435  7/1959  Fistell ........................... 324/23

OTHER PUBLICATIONS

Kempton, The Television Picture Tube–III, *Techni-Talk*, vol. 4 No. 6, Published by General Electric, Jan. 1953, pp. 1–2.

*Primary Examiner*—Roy Lake
*Assistant Examiner*—James W. Davie
*Attorney, Agent, or Firm*—Haseltine, Lake & Waters

[57]            ABSTRACT

Apparatus is used to restore the efficiency of depleted cathode-ray tubes for TV-sets, and to project the image of the cathode onto the screen of each tube, thus giving the possibility to check visually the condition of the cathode. The apparatus includes two feeders, series-connected with each other, the first of which is designed to generate a voltage up to 5000 V maximum, while the second is designed to generate a voltage up to 7000 V maximum. Both feeders are fitted with terminals, through which they can be separately connected with the electrodes of a cathode-ray tube.

5 Claims, 1 Drawing Figure

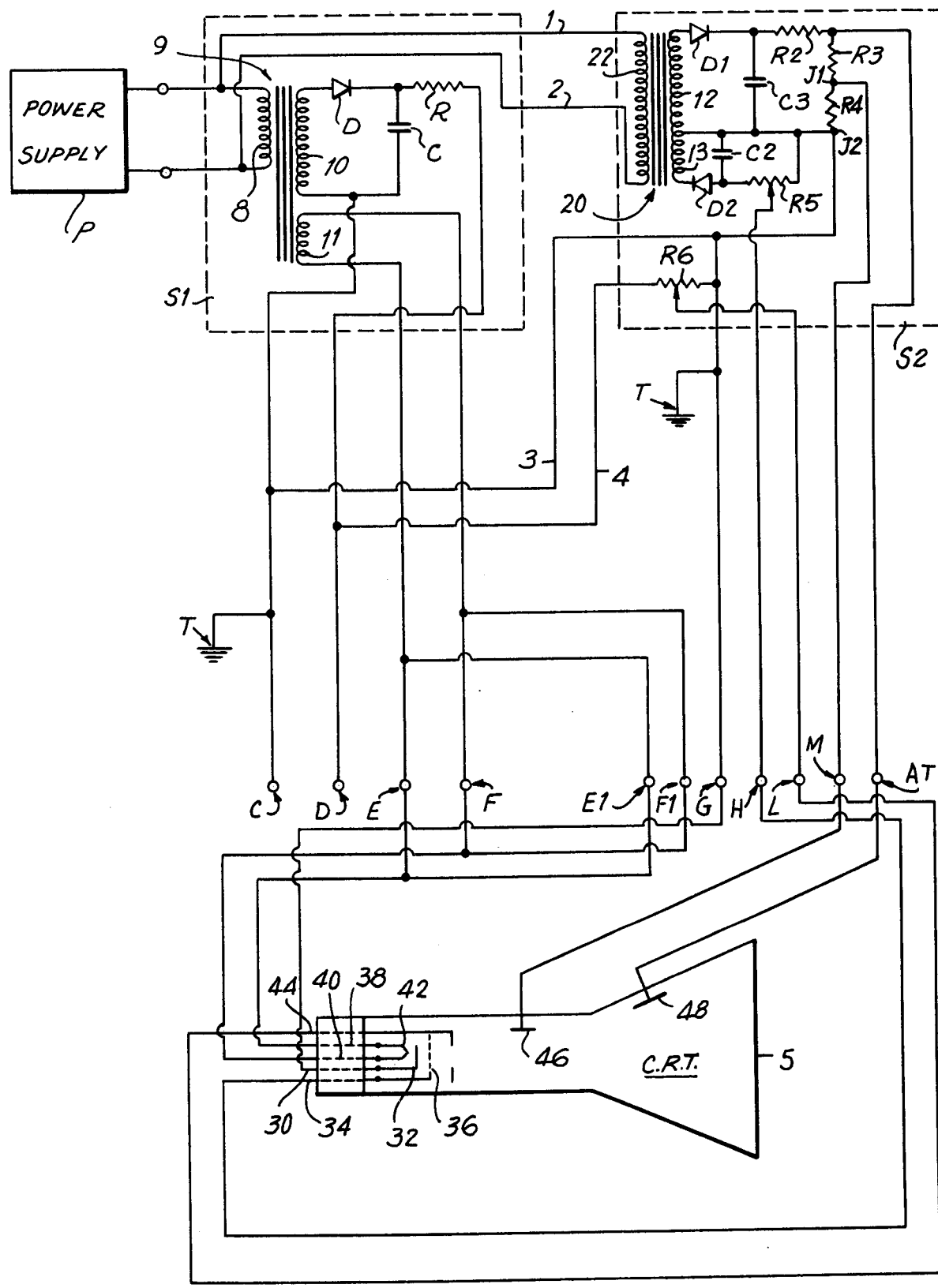

APPARATUS FOR RESTORING CATHODE-RAY TUBES

OTHER APPLICATIONS

This Application is a continuation-in-part of our earlier application, Ser. No. 395,344 filed Sept. 7, 1973 (now abandoned).

FIELD OF THE INVENTION

This invention relates to apparatus and circuits for restoring the efficiency of cathode-ray tubes of TV-sets, and for the visual control of the conditions of the cathodes of such tubes.

BACKGROUND

Following extended operation, the images appearing on a screen of a cathode-ray tube grow paler, until they fade entirely away, possibly due to the growth of an insulating film on the tube cathode due to which the emission of electrons in an amount sufficient to cause satisfactory fluorescence of the associated screen is prevented. Such depleted cathode-ray tubes are used, disposed of and replaced by new tubes.

TV-set and cathode-ray tube makers sometimes use expensive and complex devices which allow the image of a cathode to be projected on a cathode-ray tube screen, whereby to check the functional efficiency of the tubes by visual control. This is only partially useful.

SUMMARY OF THE INVENTION

A main object of this invention is the provision of an improved apparatus that allows restoring the efficiency of cathode-ray tubes of TV-sets and to check visually the condition of the cathodes thereof.

Another object is the provision of a simple, inexpensive and easily operated apparatus as previously defined.

An apparatus of the invention is characterized in that it comprises a first feeder and a second feeder, series connected with each other, said first feeder being designed to be directly connected with a power supply, and fitted with four terminals, of which the first one is grounded, while a direct, alternating, or pulsatory voltage ranging from about 50 V to 5,000 V is applied to the second terminal, and a voltage ranging from about 6 to 12 V is applied between the third and the fourth terminal; the second feeder is directly connected with said first and second terminals of first feeder, and simultaneously is also connected with a further voltage source, preferably with the transformer of the first feeder, said second feeder being fitted with at least one set comprising at least seven terminals, of which the first and second are directly connected with the third and fourth terminals of the first feeder, said second feeder being designed to apply a direct, alternating or pulsatory voltage, ranging from about 0 to −50 V to the fourth terminal, a direct, alternating or pulsatory voltage ranging from about 150 V to 400 V to the fifth terminal, a direct, alternating, or pulsatory voltage ranging from about 1000 V to 3000 V to the sixth terminal, and a direct, alternating or pulsatory voltage ranging from about 4000 V to 7000 V to the seventh terminal, while the third terminal is grounded.

BRIEF DESCRIPTION OF THE DRAWING

The invention will be disclosed in greater detail in the following description of a preferred embodiment thereof, as illustrated in the accompanying drawing in which:

The sole FIGURE diagrammatically shows an apparatus according to a preferred embodiment of the invention.

DETAILED DESCRIPTION

Two feeders are indicated in the drawing by the reference symbols S1 and S2. The feeder S1 is fitted with two terminals A and B, by which it can be connected with a conventional power supply P (e.g., 220 V A.C.), and is also fitted with a set of four terminals, C,D,E and F, of which the terminal C is connected to ground, as diagrammatically shown in the drawing and indicated at T.

Said feeder S1 is designed in such a way as to be adapted to apply a direct, or alternating, or pulsating voltage ranging from about 50 V to 5000 V to terminal D (with respect to terminal C), and a similar voltage ranging from about 6V to 12 V between the terminals E and F. The output voltage at the terminal D should preferably be in the range of 500 V and 3500 V.

The feeder S1 is moreover fitted with manual or automatic control devices, by which the above voltages can be applied to said terminals for a pre-set time, keeping in mind that the voltage applied to terminal D must be switched off after a time ranging from 1 minute down to about ¼ of a second, and preferably from about 4 seconds down to ½ second, depending on the voltage value.

The feeder S1 may be designed to apply to terminal D, either a high voltage oscillating from a minimum and a maximum value (as indicated above), or a high voltage having a constant value. Moreover, it may be fitted either with a plain manually operable switch, or with a timer of any known type, e.g. a clock movement timer or an electronic timer such as disclosed in Electronic Switching and Timing and Digital Counting Systems, Chapter 9, Electronics for Scientists, 1962; Malmstadt, Enke and Toren, W. A. Benjamin, Inc.

A further, detailed explanation of the specific structure of feeder S1 is unnecessary, because it may be easily designed in a number of different ways by those skilled in the art on the basis of above specified data. It is expedient to add that the production cost of feeder S1 is relatively low, and that the operation thereof is easy and dependable. Feeder S1 may include transformer 9 with primary winding 8 and secondary windings 10 and 11. Diode D and capacitor C are connected across secondary winding 10. Resistor R connects the junction of the latter to terminal D. Terminals E and F are connected across secondary winding 11.

Series connected with the feeder S1 is a feeder S2. In greater detail, said feeder S2 is directly connected with the terminals C and D by the leads 3 and 4, as well as with the transformer of feeder S1 by the wires 1 and 2. It is however to be noted that said wires 1 and 2 might also come from a voltage source other than the feeder S1; that is, directly from the 220 V power system. However it may be, the voltage between wires 1 and 2 should be different from the voltage between the terminals C and D. Thus, such voltage might have any value in the range, for example, of 220 V and 6,000 V.

In addition to the above-mentioned four inlets, the feeder S2 also comprises at least one outlet terminal board. In addition to the two terminals E1 and F1, which are directly connected with the terminals E and F, respectively, of feeder S1, said terminal board includes a terminal G connected to ground T. Said feeder is adapted to apply a direct, alternating, or pulsatory voltage, ranging from about 0 down to −50 V, to terminal H, a similar voltage ranging from about 150 V up to 400 V to terminal L, a similar voltage ranging from about 1000 V up to 3000 V to terminal M and a similar voltage ranging from about 4000 V up to 7000 V to terminal AT.

Also fitted in the feeder S2 are known voltage changers (see, e.g., pg. 50 of Electronics for Scientists, by means of which the voltages applied to the terminals can be manually adjusted.

The structure of four-inlets and five-outlets feeder S2 need not be described in greater detail for the purpose of simplicity, since any person skilled in the art should be able to design the same on the basis of above stated voltage values. However, feed S2 may include transformer 20 including primary winding 22 with a secondary winding including parts 12 and 13. Diode D1 and resistor R2 are connected in as to the outer end of part 12. Diode D2 and resistor R5 are series connected to the outer end of part 13. R5 is adjustable. Capacitors C3 and C2 are respectively connected across parts 12 and 13. R5 is parallel to capacitor C2. Resistors R3 and R4 are series connected via junction J1 and are parallel to capacitor C3. Terminal AT is connected to the junction between R2 and R3. Terminal M is connected to junction J1. Terminal L is connected to the brush of variable resistor R6 connected between terminal D and terminals C and G as well as to junction J2 between R4 and R5. Terminal H is connected to the brush of resistor R5. Terminal G is connected to an end of R6 and to junction J2.

Let it be assumed that it is necessary to restore a partly or wholly depleted black-and-white cathode-ray tube of a TV-set; i.e. a tube on the screen of which the images appear very pale, if not wholly fade away. Jutting-out from the rear end of said tube are pins corresponding to electrodes, i.e. the terminals of the different electric circuits or electrodes present within the tube. In particular, one of such electrodes or pins 30 are connected with the cathode 32, another pin 34 is connected with the grid 36 and two further pins 38 and 40 are connected with the inner filament 42 of the tube.

For restoring the fallen-off efficiency of a cathode-ray tube, the terminal C of feeder S1 will be connected with the pin 30 in turn connected with the tube cathode 32, while the terminal D is connected via pin 34 with the electrode of the first grid 36 and the terminals E and F are connected via pins 38 and 40 with the filament 42.

Next, an alternating voltage in the range of 6 V to 12 V is applied through the terminals E and F, until the tube filament 42 is duly overheated, i.e. for a time that may range from a few seconds up to several minutes.

As soon as the tube filament is properly overheated, a voltage in the range from 50 V to 5000 V is applied to terminal D, previously connected with the tube's first grid, over a time that may range from 1 minute down to ¼ of a second, depending on the applied voltage; e.g. a voltage of 1000 V may be applied for a time ranging from 1.5 up to 2 seconds. The tube is now regenerated, i.e. it behaves like a new cathode-ray tube, whereon sharp images can be perceived. In some cases, when a voltage of 1000 V has proved to be insufficient for attaining the required purposes, a voltage of 3000 V is applied to a terminal D for 1 second, whereby the efficiency of the tube can be wholly restored.

Color picture tubes for color TV-sets are fitted with three separate electron guns, for the red, blue and green colors, respectively. The structure of each gun is similar to that of a gun of a black-and-white or monochrome tube, whereby each color gun can be regenerated separately from all others, by having said guns successively connected with the terminals of feeder S1. However, as it can be readily appreciated, the feeder S1 might be fitted with three discrete sets of terminals, whereby the possibility is given to simultaneously regenerate all guns of a color picture tube.

By assuming now that the condition of the cathode of a black-and-white, or a color picture tube is to be visually checked before, or even after it has been subjected to a regeneration treatment by means of feeder S1, then the terminals E1 and F1 are connected to the electrodes of the tube filament 42, while the terminal G is connected with the cathode terminal, the terminal H is connected with the pin 34 of the first grid 36, the terminal L is connected with pin 44 to the electrode of the first anode, the terminal M is connected with the electrode of the second anode or focusing anode 46, and the terminal AT is connected with the electrode of the tube's main anode 48.

By manually varying the voltages at the terminals of feeder S2 within the ranges as stated above, a disk-shaped image, which is indeed the cathode image, will appear on the tube screen. If such image is luminous and uniform, or nearly uniform, this means that the efficiency of the tube is very good. When conversely, said image appears speckled, with more or less conspicuous stains, this means that the tube should be subjected to a first, and possibly also to a second regeneration treatment by the feeder S1.

Obviously, in the case of a color picture tube, the three single electron guns could be separately and successively connected with the feeder S2, or conversely feeder S2 may be fitted with three single sets of terminals, which can be simultaneously connected with the electrodes of the tube electron guns. However, in the latter case, the possibility should exist to have a voltage separately applied to the electrodes of one electron gun only, to check its cathode separately from all other cathodes of same tube.

Thus, by the device as above described, having relatively small overall sizes, it is possible to perform both a quick regeneration of cathode-ray tubes for TV-sets, and a visual check of the conditions of the tube. A basic feature of said apparatus consists in that the two feeders are series connected with each other, whereby most of the structure of first feeder S1 can be utilized for the operation of feeder S2, which thus has a very simple and inexpensive structure, with small overall sizes. Stated otherwise, the cost of a complete device, as above described, is not much greater than that of feeder S1 only.

What is claimed is:

1. An assembly for the regeneration of a cathode-ray tube for a TV-set and for the visual check of cathode conditions, said tube having pins two of which are connected to a filament and the other of which are respectively connected to a cathode, a grid, and first, focusing and main anodes, said assembly comprising a power supply, a first feeder and a second feeder series-connected with each other, said first feeder being directly connectable with said power supply and including a set of at least first, second, third and fourth terminals, the first terminal being grounded, said feeder being designed to apply a voltage in the range from 50 V to 5000 V to the second terminal, and to apply a voltage in the range of 6 to 12 V between the third and the fourth terminals, said second feeder being directly connected with said first and second terminals of said first feeder, said first feeder including a voltage source, said second feeder being connected with said voltage source, said second feeder comprising at least one set of first, second, third, fourth, fifth, sixth and seventh terminals, of which the first and second are directly connected with the third and fourth terminals of said first feeder, said second feeder being adapted to apply a voltage in the range of 0 V to −50 V to the fourth terminal thereof, a voltage in the range from 150 V to 400 V to the fifth terminal thereof, a voltage in the range of 1000 V to 3000 V to the sixth terminal thereof, and in the range from 4000 V to 7000 V to the seventh terminal thereof, the third terminal of the second feeder being grounded, the third and fourth terminals of the first feeder and the first and second terminals of the second feeder being connectable to the pins connected to said filament, said first and said second terminals of said first feeder being connectable to said pins connected to said grid and said cathode, respectively, said third, said fourth, said fifth, said sixth and said seventh terminals of said second feeder being connectable to the pins connected to said cathode, said grid, said first anode, said focusing anode and said main anode, respectively.

2. An assembly according to claim 1 wherein said voltage source to which said second feeder is connected consists of a transformer of said first feeder.

3. An assembly according to claim 1 wherein each said feeder is a source of D.C. voltage.

4. An assembly according to claim 1 wherein each said feeder is a source of A.C. voltage.

5. An assembly according to claim 1 wherein each said feeder is a source of pulsating voltage.

* * * * *